United States Patent [19]

Griffiths et al.

[11] Patent Number: 4,794,968
[45] Date of Patent: Jan. 3, 1989

[54] TIRES

[75] Inventors: Phillip N. Griffiths; Thomas Holmes, both of Sutton Coldfield, England

[73] Assignee: S P Tyres U K Limited, Birmingham, England

[21] Appl. No.: 74,057

[22] Filed: Jul. 16, 1987

[30] Foreign Application Priority Data

Jul. 16, 1986 [GB] United Kingdom ............... 8617412

[51] Int. Cl.$^4$ .......................... B60C 15/02; B60C 5/16
[52] U.S. Cl. ................................. 152/544; 152/379.5
[58] Field of Search .................... 152/379.5, 544, 539, 152/379.3, 379.4, 325, DIG. 9

[56] References Cited

U.S. PATENT DOCUMENTS

| 3,130,965 | 4/1964 | Niclas ................................. 152/543 |
| 4,148,348 | 4/1979 | French et al. ....................... 152/544 |
| 4,209,051 | 6/1980 | Udall .................................. 152/544 |

FOREIGN PATENT DOCUMENTS 0167283  1/1986  European Pat. Off. ............ 152/539

*Primary Examiner*—Michael Ball
*Attorney, Agent, or Firm*—Birch, Stewart, Kolasch & Birch

[57] ABSTRACT

A tire is disclosed, including a tread portion, sidewalls and a pair of beads each containing a substantially inextensible annular bead core, having a bead seat and an extended toe portion. The extended toe portion includes an elastomeric material, extending lengthwise from the bead core in a direction radially and axially inwards thereof, the toe of a rigidity in the direction of its length such that in use of the tire on a wheel rim having a groove complementary to the toe and engaging the toe when an axially inward force is applied to the tread portion, a radially and axially outwardly directed force is generated at the bead core to affect bead retention. The toe has a substantially continuous, circumferentially extending toe decoupling means at the junction of the tire bead seats and the toe so that the toe is effectively decoupled from the bead in bending of the toe axially inwards of the tire. The decoupling means may be a single cut of a small groove. The resultant tire may safely be fitted to a normal wheel rim without the usual groove for a TD type of tire.

10 Claims, 1 Drawing Sheet

TIRES

This invention relates to tires and in particular to the bead regions of tires of the type disclosed in UK Patent Specification No. 1,584 553. Such tires incorporate an axially and radially inwardly projecting toe having two distinct physical properties which provide a unique bead retention feature even when fitted to a one piece wheel rim of the required type. Some tires of this type are known as "TD" tires.

The physical properties of the toe are the following: first, form stiffness in the direction of the length of the toe so that the toe resists compressive force applied between the inward end of the bead toe and the bead reinforcement core and second, a reasonable degree of flexibility perpendicular to its length when not under longitudinal compression to allow fitting and stripping of the tire to and from its one piece wheel rim.

Hitherto tires with this type of bead have been unusable on normal wheel rims (i.e. wheel rims without the groove provided to accept the bead retaining toe) because the degree of toe flexibility possible without affecting the first property and reducing the degree of bead retention has not been sufficient to allow the tire bead to be correctly fitted. As a result, tires and wheel rims of this type have been made only with a non inch standard bead seat diameter to avoid such mismatching.

Accordingly, one object of the present invention is to provide a tire having the large bead retention toe of U.S. Pat. No. 1,584,553 but able to be correctly seated on a standard type of wheel rim without the special toe engaging groove. This assembly is of course by no means as safe as when a proper TD type grooved wheel is used but it means that if the "TD" tire is inadvertently fitted to a standard rim then the assembly is not a dangerous one and is as safe as a normal tire on a normal wheel rim.

This invention is based on the discovery that it is possible to partially "decouple" the toe from the remainder of the tire to greatly increase its flexibility for fitting without seriously impairing the "form stiffness". The invention also allows further toe flexibility properties to be introduced which provide four other advantages, as will be explained.

According to one aspect of the present invention a tire comprises a tread portion, sidewalls and a pair of beads each containing a substantially inextensible annular bead core, having bead seats and an extended toe portion comprising elastomic material, extending lengthwise from the bead core in a direction radially and axially inwards thereof, the toe being of a rigidity in the direction of its length such that in use of the tire on a wheel rim having a groove complementary to the toe and engaging the toe when an axially inward force is applied to the tread portion a radially and axially outwardly directed force is generated at the bead core to affect bead retention, characterized by the toe including a substantially-continuous circumferentially-extending toe decoupling means positioned substantially at the junction of the tire bead seat and the toe so that the toe is effectively decoupled from the bead in bending of the toe axially inwards of the tire.

Preferably the decoupling means comprises a single cut of not more than 1 mm in width extending into the toe axially inwardly and radially outwardly. Alternatively a groove or notch may be provided having a depth and width of not more than 3 mm. The decoupling means may also be provided without a physical discontinuity, for example, by using an insert of different strength material or by ending the fabric reinforcement around the toe at the point of decoupling.

Further aspects of the present invention will be apparent from the following description, by way of example only, of some embodiments in conjunction with the attached diagramatic drawings wherein.

Figure 1:
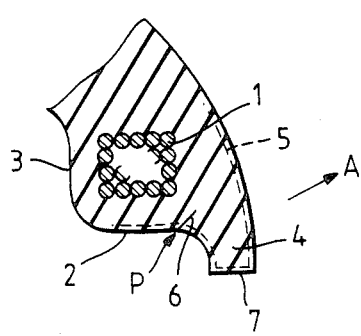
FIG. 1 is a cross-section of the bead of a TD tire according to the invention.

The tire bead shown in FIG. 1 is a 185/65R365 and comprises a bead reinforcement core 1, a bead seating region 2 and a wheel rim flange contacting portion 3. A radially and axially inwardly projecting toe 4 is formed of a hard rubber compound and this is reinforced by a skin reinforcement or chafer ply 5 of cross woven fabric. This construction is entirely typical of a "TD" type of tire.

The bead seating region 2 is a tapered, substantially straight cross section line and this joins the curved axially outer surface of the toe at a point P. At this point P a knife cut 6 is cut in the bead inclined as shown so that it is effectively perpendicular to the centre line of the toe 4 from bead 1 to toe tip 7. The knife cut has a depth of 3 mm. The knife cut 6 is circumferentially continuous around the tire.

Figure 2:
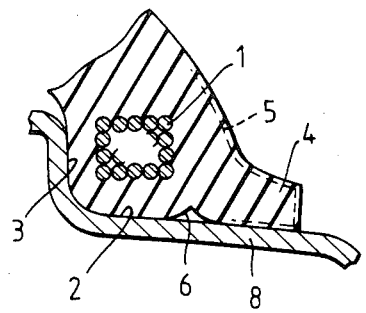
FIG. 2 shows the bead of FIG. 1 fitted to a normal wheel rim.

The effect of the knife cut 6 is to decouple the main part of the toe 4 from the remainder of the bead when the toe is subject to a bending force in the general direction of arrow A. Thus, when the tire bead is fitted to a wheel rim 8 (as shown in FIG. 2) which does not have the normally required "TD" tire groove the toe 4 is able to bend as shown and the bead seats correctly and safely on the bead seat on the wheel rim. The resultant assembly provides a similar degree of bead retention to a normal (non "TD") tire on the same wheel rim and so the "TD" tire may be safely so fitted.

The knife cut length may be deeper than 3 mm and may be as much as $\frac{1}{2}$ of the width of the toe.

Figure 3:
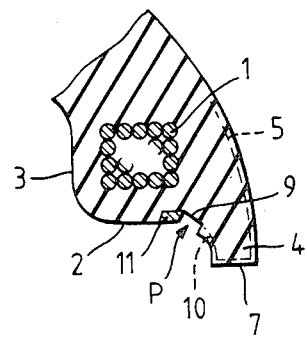
FIG. 3 is a cross-section of an alternative construction to FIG. 1.

The embodiment shown in FIG. 3 has at the point P a groove or notch 9 which is circumferentially continuous and has a depth of 3 mm and a width of 3 mm. The groove 9 provides the decoupling means and also still further improves the fit of the tire to a normal rim with a bead retaining hump as the groove 9 can be arranged to fit over the hump and thus avoid causing mis-seating of the tire bead. The grooved cross-section may be other than rectangular, for example, round or circular.

FIG. 3 also shows a further decoupling means in that the toe reinforcement ply 5 has its axially outer edge 10 positioned at the decoupling point P. This may be used for decoupling either in addition to a notch or cut or separately.

Each of the constructions may have in addition to the decoupling means an air seal improving component in the form of a narrow strip of soft rubber immediately adjacent to the decoupling point P. This is, of course, an optional feature.

Figure 4:
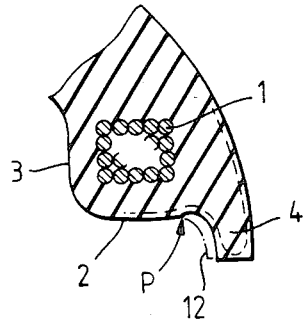
FIG. 4 is a cross-section of another toe shape.
Figure 5:
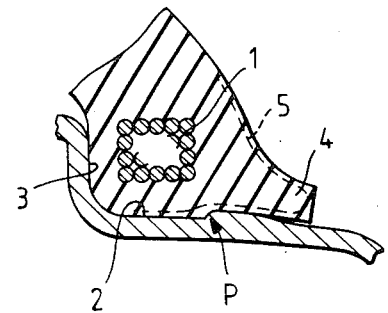
FIG. 5 shows the bead of FIG. 4 fitted to a normal wheel rim with hump.

The embodiment in FIGS. 4 and 5 has the toe 4 narrower than before by means of continuing the depth of the cut-out or groove 9 to the end of the toe 4. The broken line in FIG. 4 shows the original toe profile 12 and the solid line the actual cut-away profile. The toe 4 is otherwise as before, including its chafer or skin fabric layer 5. This construction can successfully be used with some types of rim with a hump or flat hump where the cut away toe assists in allowing the "TD" type of toe to seat correctly on its bead seat.

In another arrangement, not shown, the groove may be filled by a high extensibility rubber compound so that no opening is provided but the decoupling property is still provided.

It is of course important that the decoupling means is positioned at or near the point P to ensure it is only the bending property of the toe which is enhanced so that bead retention by generation of bead core tension as a result of bead rotation and compressive forces being generated in the toe can occur.

Having now described our invention what we claim is:

1. A tire, comprising:
   a tread portion having respective sidewalls;
   a pair of beads formed on said sidewalls, each of said beads including:
   a substantially inextensible annular bead core,
   a bead seat,
   an extended toe portion of elastomeric material extending lengthwise from said bead core in a direction radially and axially inwards thereof, and having a rigidity in the direction of its length such that, during use of said tire on a wheel rim having a groove complementary to said toe and engaging said toe, when an axially inward force is applied to said tread portion, a radially axially outwardly directed force is generated at said bead core for retaining said bead, said toe portion having a substantially continuous, circumferentially extending toe decoupling means provided in the form of a cut, groove, or notch and located at a junction of said tire bead seat and said toe portion, for decoupling said toe portion from said bead during bending of said toe portion axially inwards of said tire.

2. A tire according to claim 1, wherein said decoupling means comprises a single cut of not more than 1 mm in width extending into said toe portion in a direction axially inward and radially outward of said tire.

3. A tire according to claim 2, wherein said cut has substantially no width.

4. A tire according to claim 2, wherein said cut has a depth of not more than half of the width of said toe portion at a specific point in the direction of said cut.

5. A tire according to claim 1, wherein said coupling means comprises a groove having a depth similar to its width.

6. A tire according to claim 1, wherein said decoupling means comprises a cut of between 2 and 4 mm in depth which continues to the end of said toe portion such that said toe portion, when said tire is fitted to a wheel rim with a bead retaining hump, may lie on said hump.

7. A tire according to claim 1, wherein said tire toe portion contains a reinforcement layer extending around and adjacent to the surface of said toe portion and said decoupling means comprises a continuous cut in said reinforcement layer.

8. A tire according to claim 7, wherein said continuous cut is an edge of said reinforcement layer such that said layer begins at a decoupling point of said decoupling means and extends around said toe portion therefrom.

9. A tire according to claim 1, wherein said decoupling means is provided as a groove or notch having a depth and width of not more than 3 mm.

10. A tire according to claim 1, wherein said bead seat includes immediately adjacent to said decoupling means a soft strip of elastomeric material for providing air retention when said tire is fitted to a normal rim.

* * * * *